(12) United States Patent
Neet

(10) Patent No.: US 6,463,338 B1
(45) Date of Patent: Oct. 8, 2002

(54) INDUSTRIAL CONTROLLER AND NETWORK CARD WITH BUFFER NEGOTIATION

(75) Inventor: Kyle E. Neet, University Heights, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 09/408,669

(22) Filed: Sep. 30, 1999

(51) Int. Cl.$^7$ ................................................ G05B 11/01
(52) U.S. Cl. ............................ 700/17; 700/19; 700/20; 700/83; 700/2; 700/5; 345/676; 345/961; 345/962; 345/968; 340/3.71; 340/825.07; 710/100; 710/300; 710/305
(58) Field of Search ............................ 700/2–5, 17, 18, 700/19, 20, 83; 345/661, 876, 961, 962, 968; 710/52, 58, 100, 300, 305; 340/825.07, 3.71

(56) References Cited

U.S. PATENT DOCUMENTS

| | | | | | |
|---|---|---|---|---|---|
| 5,193,189 A | * | 3/1993 | Flood et al. | ................... | 700/18 |
| 5,469,150 A | * | 11/1995 | Sittle | ..................... | 340/825.07 |
| 5,530,643 A | * | 6/1996 | Hodorowski | ................... | 700/86 |
| 5,838,563 A | * | 11/1998 | Dove et al. | ................... | 700/83 |
| 5,953,226 A | * | 9/1999 | Mellish et al. | ................. | 700/28 |
| 6,035,240 A | * | 3/2000 | Moorehead et al. | ............ | 700/2 |

\* cited by examiner

*Primary Examiner*—Ramesh Patel
(74) *Attorney, Agent, or Firm*—Keith M. Baxter; Alexander M. Gerasimow; William R. Walbrun

(57) ABSTRACT

An interface for a network communication card for industrial controllers uses a dual-port memory that may be re-partitioned by values communicated through the dual-port memory itself. A default partitioning and a non re-partitionable common area allow flexible re-partitioning without disrupting the communication necessary for the partition to take place. Negotiation between the controller and network card allow maximum flexibility in re-partitioning while respecting partitioning limits characteristic of the network card and its network.

15 Claims, 3 Drawing Sheets

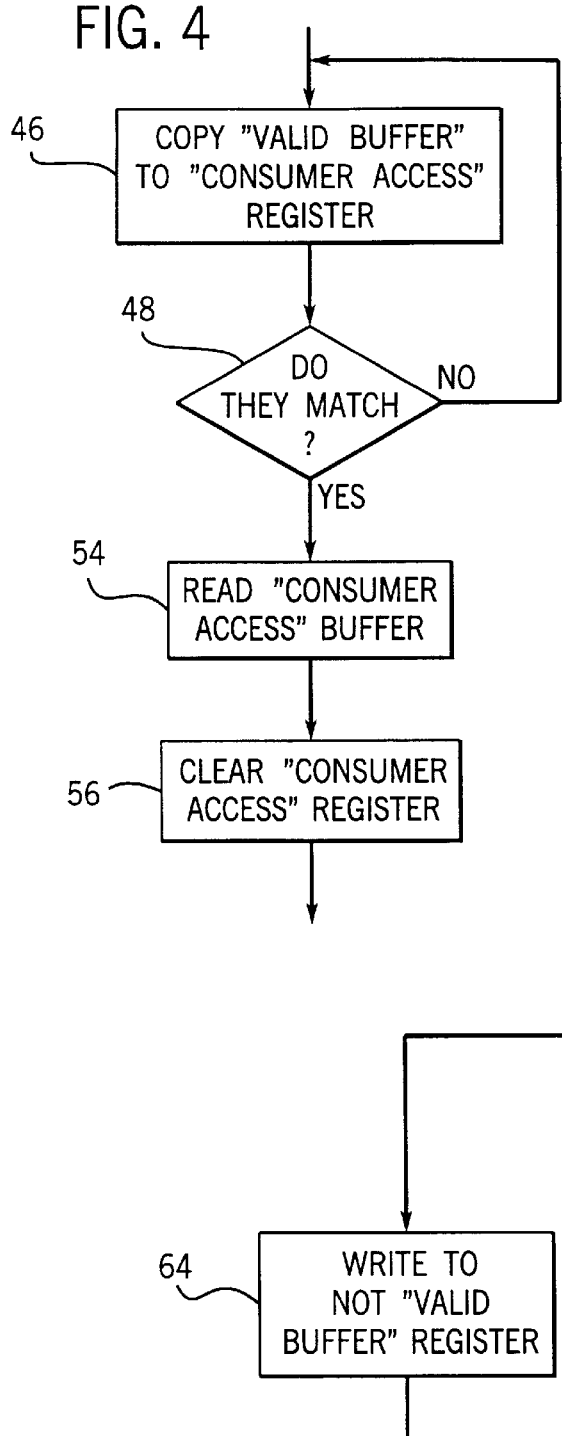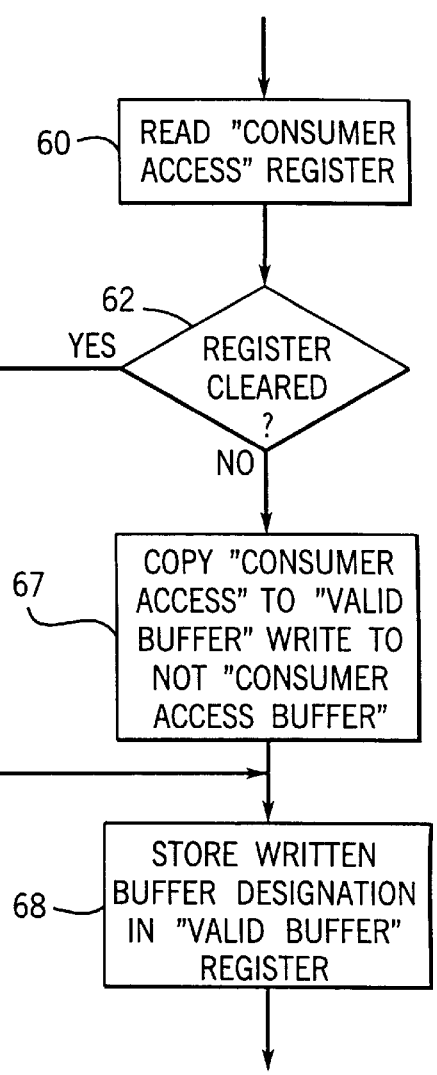

INDUSTRIAL CONTROLLER AND NETWORK CARD WITH BUFFER NEGOTIATION

CROSS-REFERENCE TO RELATED APPLICATIONS

STATEMENT REGARDING FEDERALLY SPONSORED RESEARCH OR DEVELOPMENT

BACKGROUND OF THE INVENTION

The present invention relates to industrial controllers and in particular to a network card that can be attached to an industrial controller to allow the industrial controller to communicate with communication networks of different protocols.

Industrial controllers are special purpose computers used for controlling industrial processes and manufacturing equipment. Under the direction of a stored control program, the industrial controller examines a series of inputs reflecting the status of a controlled process and in response, adjusts a series of outputs controlling the process. The inputs and outputs may be binary, that is on or off, or analog providing a value within a continuous range of values.

Industrial controllers may communicate with other industrial controllers or remote input and output (I/O) devices by means of well-known, high-speed serial communication networks such as Ethernet, ProfiBus, FieldBus, FireWire, and DeviceNet or by proprietary data networks such as the Data Highway series protocols developed by the assignee of the present application. In order to accommodate the variety of protocols, a series of network cards may developed, each tailored to provide communications with a different network. The industrial controller is then constructed in modular form to allow different network cards to be attached to it as needed.

The interface between the network card and the industrial controller must efficiently transmit large amounts of data as part of the communication process. One simple method of accommodating a transfer of large amounts of asynchronous data is by the use of a dual-port memory into and from which the industrial controller and the network card may both independently write and read. Such an interface also allows the adoption of a well-established memory interface such as the Personal Computer Memory Card (PCMCIA) used in laptop computers and the like. The PCMCIA standard describes the signals and low-level protocol of the interface process.

A dual-port memory may be partitioned into a number of buffer areas to facilitate the bi-directional and asynchronous transfer of data. The size of the buffers may be selected to facilitate the use of the network card with many different types of industrial controllers. Generally, however, any set of standard buffer sizes will be less than optimal for a given industrial controller and it would be desirable to allow the industrial controller to determine the partition values for the dual-port memory according to the type of industrial controller and the control environment.

There are two problems with allowing partitioning of the buffers by the industrial controller. The first is that any partitioning must be compatible with the network card and the particular communication protocol that it supports. While this may be ensured by providing the industrial controller with special programs indicating the partition limits and buffer requirements for each different network, such additional programming is expensive and burdensome and limits the use of pre-existing industrial controllers with later introduced network cards for which they are not programmed.

A second problem is that the communications path between the industrial controller and the network card is the very memory being partitioned and prior to partitioning of the memory, no communication can be established. Adding separate communication lines outside of the memory interface for communicating partitioning information can solve this problem of communication, but this comes at the cost of complicating a simple interface using a standard memory card protocol.

What would be desirable is a simple way to permit the industrial controller to partition the buffer areas of a network card using a standard memory interface.

BRIEF SUMMARY OF THE INVENTION

The present invention provides an interface between an industrial controller and a replaceable network card using a dual-port memory. The network card, at power up, proposes default buffer partitions in common areas of the dual-port memory that is designated to not be re-partitioned. In this way, it can be assured that the industrial controller and network card can both read and write to these common areas. The industrial controller may read the values in the common area of the memory to propose new partition values. The network card may accept or reject these proposed new partition values as part of a negotiation process using knowledge about partitioning requirements unique to the network and/or the network card. The negotiation process allows maximum flexibility in modifying the partitioning by the industrial controller while ensuring compatibility with the particular network whose details may be invisible to the industrial controller.

Specifically then, the present invention provides an interface for a network card used with an industrial controller. The network card includes a dual-port memory partitionable to provide buffers for the passage of messages between the network card and the industrial controller and a connector half providing a releasable electrical interface between the dual-port memory and the industrial controller allowing access to the dual-port memory by the industrial controller when the connector half is connected to a corresponding connector half on the industrial controller. An electronic computer executes a stored program to receive via the dual-port memory, an indication of at least one proposed new partitioning value for the dual-port memory from the industrial controller and evaluate the proposed new partitioning value. If the new value is acceptable, the computer re-partitions the dual-port memory to comport with the proposed new partitioning value.

It is thus one object of the invention to provide for re-partitioning of a dual-port memory using the dual-port memory itself to communicate the re-partitioning values and thus eliminate the need for a separate data channel between the industrial controller and the network card outside of the dual-port memory.

It is another object of the invention to permit an industrial controller without a priori knowledge about the operation of the network to nevertheless propose new buffer partitioning that may be better suited to the control task. Negotiation and review by the network card ensures that the ultimately selected partitioning is compatible with the network requirements.

A non-volatile memory in the network card may hold default values for the partitioning of the dual-port memory into buffers and the network card may write the default values for the partitioning to the dual-port memory prior to receiving proposed new partitioning values.

It is thus another object of the invention to allow the network card to be used without the negotiation when optimization is not required or where the industrial controller is not programmed for the negotiation process.

The program step of writing the default partitioning value to the common memory area may be concluded by generating an interrupt to the industrial controller.

Thus it is another object of the invention to make use of the interrupt lines normally associated with a memory interface to eliminate a need for polling of the dual-port memory to determine changes in partitioning values.

The dual-port memory may be a non re-partitionable portion and a re-partitionable portion where the default and proposed new partitioning values describe partitioning of the re-partitionable portion. The new partitionable value may be received through the non re-partitionable portion.

Thus it is another object of the invention to allow reliable communication about re-partitioning between the industrial controller and the network card using a dual-port memory despite the re-partitioning of the dual-port memory.

The network card may report to the industrial controller via the dual-port memory whether the proposed new partitioning value is acceptable to the operation of the network card.

Thus it is another object of the invention to permit a series of proposal of partition values from the industrial controller such as may allow the industrial controller to approach a commonly optimal partitioning without knowledge of the network requirements.

The industrial controller may communicate proposed new partitioning values by overwriting the default values (during start-up) or by means of an instruction carried through the partitionable portion of the dual-port memory (after start up is complete) proposing new partitioning values.

Thus it is another object of the invention to allow efficient communication of proposed new values through overwriting during the start up process when the larger partitioned portion of the dual-port memory is not available and later to permit the use of standard messaging for this purpose.

The foregoing and other objects and advantages of the invention will appear from the following description. In the description, reference is made to the accompanying drawings which form a part hereof, and in which there is shown by way of illustration a preferred embodiment of the invention. Such embodiment does not necessary represent the full scope of the invention, however, and reference must be made to the claims herein for interpreting the scope of the invention.

BRIEF DESCRIPTION OF THE DRAWINGS

FIG. 4 is a flow chart showing operation of the consumer of FIG. 3 preparing to read one of the buffers;

FIG. 5 is a flow chart similar to FIG. 4 showing operation of the consumer of FIG. 3 preparing to write to one of the buffers;

DETAILED DESCRIPTION OF THE INVENTION

Figure 1:
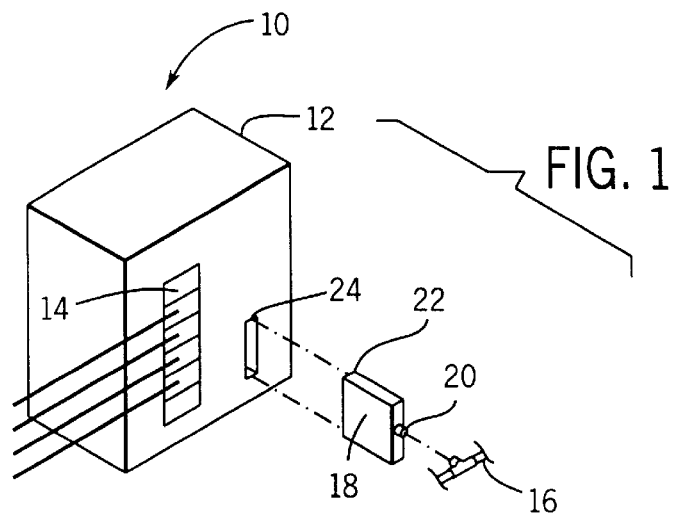
FIG. 1 is a simplified perspective view of an industrial controller incorporating a replaceable network card of the present invention and showing a network connection thereto.

Referring now to FIG. 1, an industrial control system 10 may include a controller 12 incorporating an internal microprocessor and memory (not shown in FIG. 1) and one or more input/output (I/O) ports 14 communicating with a controlled process or the like. A network 16 may connect to the industrial controller 12 via a removable network card 18. One end of the network card 18 holds a network connector 20 connecting to the network 16 and on the other end of the network card 18 holds a first interface connector 22 received by a corresponding second interface connector 24 on the controller 12. The first and second interface connectors 22 and 24 permit different network cards 18 (not shown) to be attached to the controller 12 so that it may be used with different types of networks. The controller 12 may support multiple network cards 18 allowing it to communicate with several networks 16 and to operate as a bridge.

Figure 2:
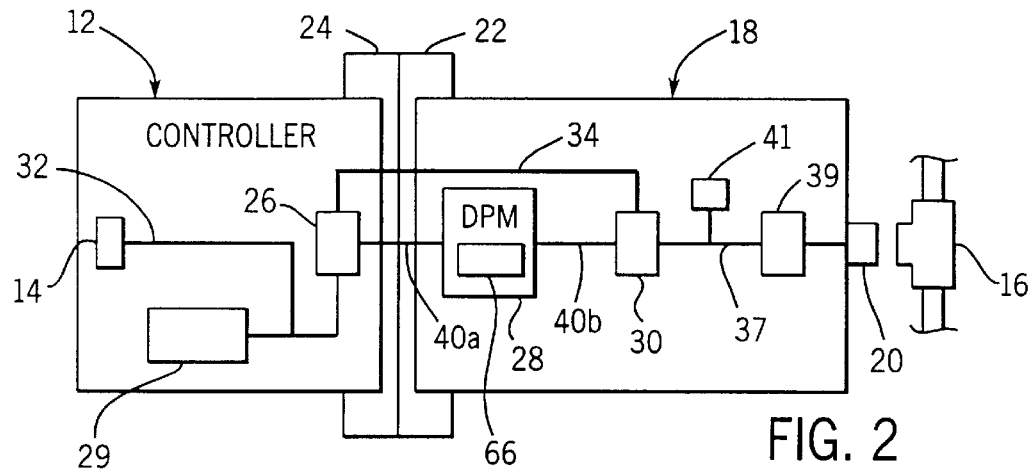
FIG. 2 is a schematic block diagram of the industrial controller and the network card as connected through a releasable connector showing a shared dual-port memory and interface lines between processors of the host and card.

Referring to FIG. 2, the interface connectors 22 and 24, when joined, allow communication between a processor 26 of the controller 12 and a dual port memory 28 within the network card 18. By using a dual port memory 28 as a medium of communication between the controller 12 and the network card 18, a standard Personal Computer Memory Card (PCMCIA) electrical interface may be adopted, such as is known in the art. In keeping with this standard, the connectors 22 and 24 also allow for the transmission of power, ground and various control signals between the controller 12 and the network card 18.

A second processor 30 in the network card 18 also communicate via interrupt lines 34 through interface connectors 22 and 24 with the processor 26 of the controller 12 and communicates with a second port of the dual port memory 28. The dual port memory 28 allows the processors 26 and 30 to exchange data with the dual port memory asynchronously meaning that they may independently read and write from and to the dual port memory 28 at arbitrary times. The interrupt lines 34 allow processor 30 to interrupt processor 26 and allow processor 26 to interrupt processor 30. As is understood in the art, an interrupt line, when raised, causes a processor to suspend its execution of a current program and to jump to a predefined interrupt routine and to complete the execution of that interrupt routine before returning to its previous program. The use of interrupts avoids the need for a processor or other device to poll a particular input or output value or memory location such as may be unduly time consuming if rapid response is required Processor 26 of the controller 12 communicates also via an internal bus 32 with a separate memory 29 and with the I/O port 14. The memory 29 holds a control program for the controlled process, an operating system, and programming to execute the present invention as will be described.

Similarly, processor 30 of the network card 18 may also communicate via a bus 37 with a communication circuit 39 providing for lower level protocols necessary to communicate on network 16. These low level protocols include but are not limited to the above mentioned high speed serial communication networks of Ethernet, ProfiBus, FieldBus, FireWire, and DeviceNet or by proprietary data networks such as the Data Highway series protocols developed by the assignee of the present application, all well known in the art or commercially available. Processor 30 of the network card 18 may also communicate via bus 37 with a nonvolatile memory 41 holding default buffer partitioning values as will be described and an operating program and programming to execute the present invention as will be described.

Figure 3:
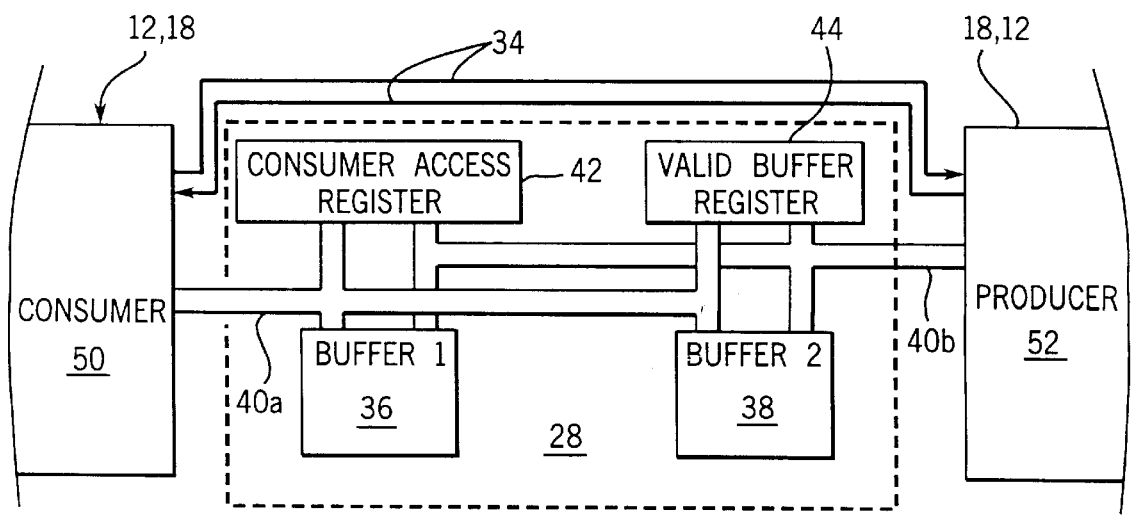
FIG. 3 is a detailed version of FIG. 2 showing partitioning of the half of the dual-port memory into two buffers and a consumer access register and a valid buffer register for one producer-consumer pair.

Referring to FIG. 3, in order to provide for reliable exchange of data between the controller 12 and the network card 18, the dual port memory 28 may be partitioned to provide for two buffer and two control registers for each direction of data flow between the controller 12 and the network card 18. In this regard, the controller 12 may act as either a data producer 52 when it is writing to the dual port memory 28 or data consumer 50 when it is reading from the dual port memory 28. Likewise the network card 18 may act as a data producer 52 when it is writing to the dual port memory 28 or data consumer 50 when it is reading from the dual port memory 28. One producer 52 and one consumer 50 define a direction of data flow.

The protocols for data producer 52 and data consumer 50 do not change depending on whether the data producer 52 and data consumer 50 are the controller 12 or network card 18. Accordingly, the example of a single data producer 52 and data consumer 50 may be provided.

For each data direction, the dual port memory 28 provides a first buffer 36 and a second buffer 38 communicating via address and data bus 40a with the data consumer 50 and with address and data bus 40b with the data producer 52. Generally these address and data buses 40a and 40b also serve the opposite data direction as well as reflecting the fact that the controller 12 and network card 18 may only read or write at one time. Also for each data direction, a consumer access register 42 and a valid buffer register 44 are provided by a dual port memory 28 accessible by the address and data buses 40a and 40b, respectively. For practical reasons, each of the consumer access register 42 and the valid buffer register 44 are eight bits, however, it will be understood that smaller register sizes may be sufficient. The consumer access register 42 must hold three values, nominally 0,1 and 2, indicating respectively that no buffer, the first buffer 36 or the second buffer 38 are being read. The valid buffer register 44 must hold at least two values, nominally 1 and 2, indicating, respectively, that the first buffer 36 or the second buffer 38 has last been written to.

The valid buffer register may hold additional values such as those indicating that the producer hasn't written yet; and that the buffer is no longer valid or the data has not been updated which are not required in the present invention.

Generally, during the transfer of data from the data producer 52 to the data consumer 50, data must be buffered in one of buffers 36 and 38. Critical to efficient buffering, given the asynchronicity provided by the dual port memory 28, is preventing a reading of one buffer while writing of that buffer is ongoing such as may result in data errors. The valid buffer register 44 and the consumer access register 42, and the protocol of the present invention assure that no concurrent reading and writing of the same buffer occurs.

Referring then to FIG. 4, a data consumer 50 wishing to read from buffer 36 or 38 begins as indicated by process block 46 by copying the value from the valid buffer register 44 to the consumer access register 42. This step is intended to provide information to the producer 52 as to a state of current reading by the consumer 50.

The transfer of data between the valid buffer register 44 and the consumer access register 42, according to normal computer protocol, requires a reading of the valid buffer register 44 in a first operation and a writing to the consumer access register 42 in a second operation. In between this reading and writing, as will be understood from the description provided below, the producer 52 as a result of its asynchronous operation, could conceivably change the valid buffer register 44 and begin a new write operation using an invalid value of the consumer access register 42, as will be described below. Accordingly at decision block 48, the consumer 50 reads the valid buffer register 44 and consumer access register 42 to check to see if they are the same.

If at decision block 48, the values are not the same, then the consumer 50 repeats process block 46 recognizing the probability of an intervening writing operation. The duration of the writing operation makes it unlikely that multiple repeats of this loop will occur, but the possibility is accommodated by the protocol, which will continue to loop as required.

When at decision block 48, if the values of the valid buffer register 44 and the consumer access register 42 are the same, then the consumer 50 proceeds to process block 54 and the buffer indicated in the consumer access register 42 is read. Subsequent changes of the valid buffer register 44 by the producer 52 are acceptable because the value of the consumer access register 42 has been set properly.

At the conclusion of the reading of the buffer by the data consumer 50, and as indicated at process block 56, a zero is written to the consumer access register 42 clearing it. It will be recognized that the particular designation of the cleared state and in fact of the buffers 36 and 38 are arbitrary so long as three distinct states are used and both the consumer and producer are using the same three distinct states. This concludes the reading process by either the controller 12 or the network card 18.

Referring now to FIG. 5, when the producer 52 wishes to write to one of the buffers, it begins as indicated by process block 60, by reading the consumer access register 42 to see whether the data consumer 50 is currently reading a buffer 36 or 38. At decision block 62, if the consumer access register 42 is cleared indicating there is no on-going reading either buffer 36 or 38, then the data producer 52 proceeds to process block 64 and writes to the buffer 36 or 38 that is not indicated in the valid buffer. Thus, for example, if the valid buffer register 44 indicates buffer 36, the producer writes to buffer 38. In this way, the producer 52 has maximum flexibility to avoid rewriting the latest written buffer 36 or 38.

Referring again to decision block 62, if the consumer access register 42 is not clear indicating that a reading of one of the buffers 36 and 38 is ongoing, then at process block 67, the producer 52 writes the consumer access register back to valid buffer register and then writes to the buffer not indicated by the consumer access register 42. Thus, for example, if the consumer access register 42 indicates buffer 36, the producer writes to buffer 38. In any case, as indicated by process block 68 following process block 64 and 67, at the conclusion of the writing of the buffer, the designator of the written buffer is stored in the valid buffer register 44 thus to serve as an indication to the consumer 50 as the next buffer to read as has been described above.

Referring now to FIGS. 2, 3 and 6a and 6b, the present invention allows the size of the common areas 66 and their partitioning to be varied depending upon the particular controller 12 and the expected size of data being transferred. For example, when the common areas 66 are used to communicate I/O values, it may be desirable to vary the size of the common area 66 used for this purpose according to the number and type of I/O used in the controlled process. Nevertheless, the present invention also recognizes that it is desirable that the network card 18 be immediately available with default buffer sizes when optimized buffer sizes are not critical.

In the preferred embodiment, multiple negotiable buffer areas may be provided each having an associated size variable as indicated in Table I as follows:

TABLE I

| Buffer Size Variable | Length |
| --- | --- |
| Host to Card Message Queue Size | 4 Bytes |
| Host to Card Message Area Size | 4 Bytes |
| Card to Host Message Queue Size | 4 Bytes |
| Card to Host Message Area Size | 4 Bytes |
| Input Image Table Size | 4 Bytes |
| Output Image Table Size | 4 Bytes |
| Card to Host Mailbox Queue Size | 4 Bytes |
| Connected Data Mailbox Size | 4 Bytes |
| Host Scratch Area Size | 4 Bytes |

Generally the queues provide a control function indicating the type and location of data stored in their corresponding message or mailbox areas. The image tables store values of I/O used in the control process as communicated over the I/O ports (see FIG. 1). The network card 18 may act as a scanner collecting I/O data from remote devices attached to the network 16 and placing it in the image tables. The scratch area allows the network card 18 to act as added memory for the controller 12.

Figure 6A:
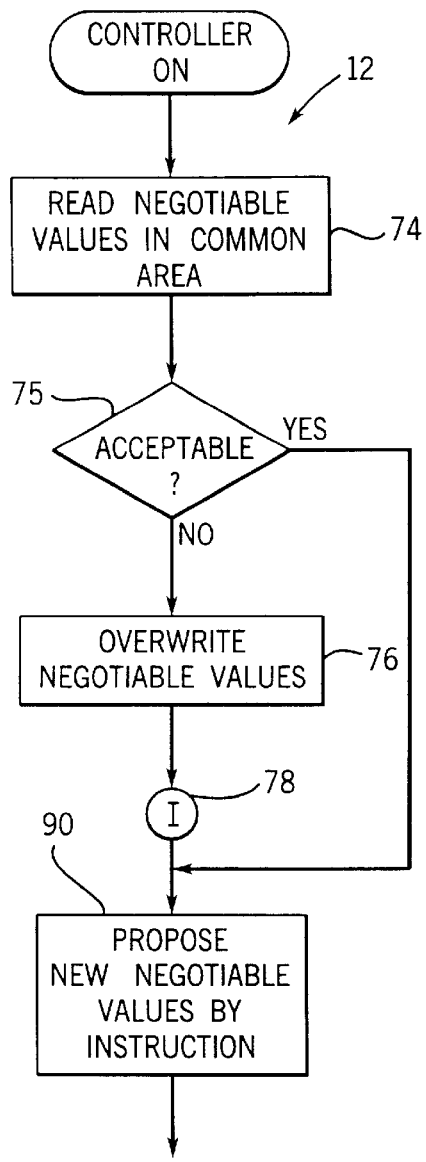
FIGS. 6a and 6b are flow charts juxtaposed to show relative times between operation of the host in FIG. 6a in negotiating for new partitioning values of the buffers and operation of the network card FIG. 6b in responding to such proposals for new buffering space.
Figure 6B:
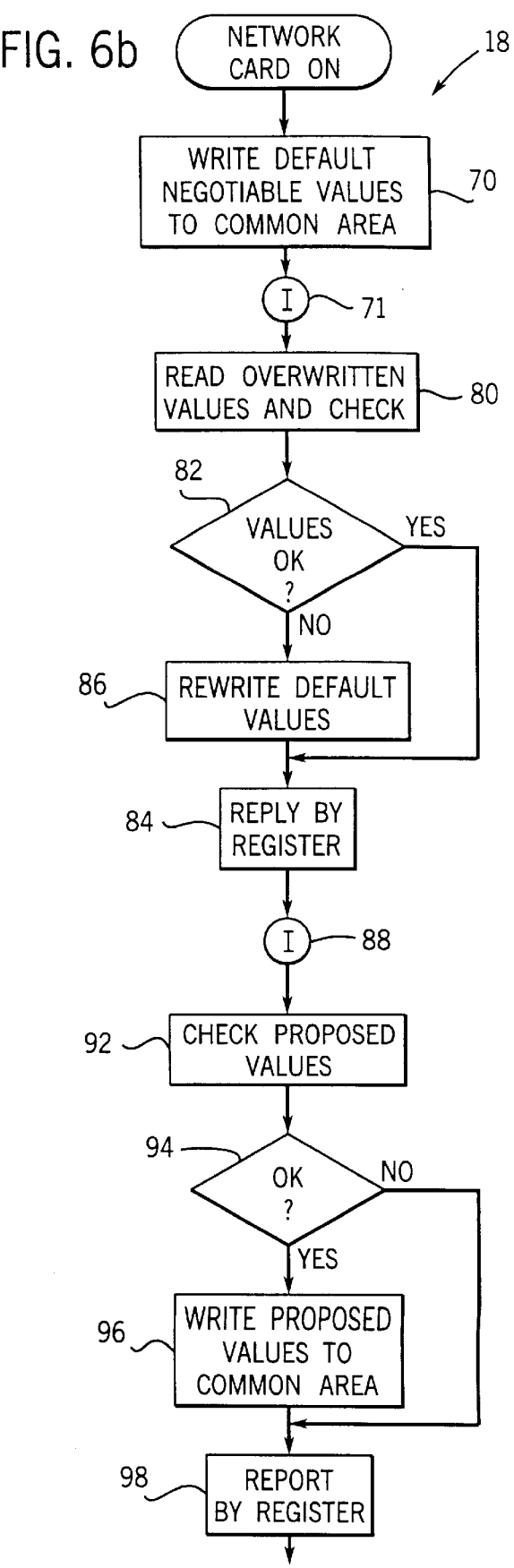

Referring to FIGS. 6a and 6b, when powered-up, network card 18 at process block 70 writes default values for each of the size variables of Table I from its nonvolatile memory 41 to a common area 66 in the dual port memory 28 where the size variables are stored. The network card 18 then interrupts the controller 12 via the interrupt lines 34.

As indicated by process block 74, upon receiving the interrupt, the controller 12 may read the default values in the common area 66. If these values are acceptable to the controller 12 as indicated by decision block 75, then no further action is taken. However, if the controller 12 has preferred sizes for one or more of these buffer areas, then at process block 76, it may overwrite the default values stored in the common area 66. At this time, an interrupt is generated as indicated by interrupt symbol 78.

In response to the interrupt, the network card 18 reads the overwritten values at process block 80 and checks them against its internal operating limits such as may be programmed into nonvolatile memory 41. These limits may include the size of the dual port memory 28, predetermined minimums for certain messaging functions and compatibility between designated queue and messaging or mailbox areas.

If the values proposed by the controller 12 are acceptable to the network card 18, as determined by decision block 82, the program of the network card 18 proceeds to process block 84 where a response is made to the controller 12 indicating such via a special negotiation arbitration register whose size and position in the dual port memory 28 is not negotiable and hence may be statically located.

If the values proposed by the industrial controller 12 are not acceptable to the network card 18, then at process block 86, the network card 18 rewrites the default values from the nonvolatile memory 41 to the common area 66 and at process block 84, an indication is made to the controller 12 of the result of that evaluation via the negotiation arbitration register.

In the preferred embodiment, a value of one is written to the negotiation arbitration register in the common area 66 if the values proposed by the controller 12 are acceptable, but if they are not acceptable, then a value of zero is written to the negotiation arbitration register.

In either case, an interrupt is then issued by the network card 18 as indicated by interrupt symbol 88 to reply to the controller 12 which may read the negotiation arbitration register to determine whether its proposed values have been accepted.

At a much later time, the controller 12 may send an instruction as indicated by process block 90 to the card via the message areas requesting a change in the buffer values and offering values in the instruction data field. These instructions may be received as indicated by process block 92 and evaluated in a similar manner as the evaluation occurring at decision block 82 but as shown in decision block 94. If the values are acceptable, they are written to the common area 66 by the network card 18 as indicated by process block 96 and a reply is made in process block 98 via the negotiation arbitration register in a manner similar to that shown in process block 84, however, without the need for interrupts.

In this way, the benefit of default value is obtained while establishing a negotiation between the two devices of the controller 12 and the network card 18 such as allows for flexible application of the network card 18 to different controllers 12.

The above description has been that of a preferred embodiment of the present invention, it will occur to those that practice the art that many modifications may be made without departing from the spirit and scope of the invention. In order to apprise the public of the various embodiments that may fall within the scope of the invention, the following claims are made.

I claim:

1. An interface for a network card used with an industrial controller, the network card comprising:

a dual-port memory partitionable to provide buffers for the passage of messages between the network card and the industrial controller;

a connector half providing a releasable electrical interface between the dual-port memory and the industrial controller allowing access to the dual-port memory by the industrial controller when the connector half is connected to a corresponding connector half on the industrial controller;

an electronic computer executing a stored program to:
  (i) receive via the dual-port memory an indication of at least one proposed new partitioning value for the dual-port memory from the industrial controller; and
  (ii) evaluate the proposed new partitioning value and if it is acceptable, re-partitioning the dual-port memory to comport with the proposed new partitioning value.

2. The interface of claim 1 including further:

a non-volatile memory holding default values for the partitioning of the dual-port memory into buffers; and wherein the electronic computer further executes the stored program to write the default values for the partitioning of the dual-port memory to the dual-port memory for review by the industrial controller prior to receiving via the dual-port memory the at least one proposed new partitioning value.

3. The interface of claim 2 wherein the connector half further provides a communication of interrupt signals between the industrial controller and the network card and wherein the writing of the default values to the common memory area concludes with the generation of an interrupt from the network card to the industrial controller.

4. The interface of claim 1 wherein the dual-port memory includes a non re-partitionable portion and a re-partitionable portion and wherein the default and proposed new partitioning value describe partitioning of the re-partitionable portion and wherein the at least one new partitionable value is received through the non re-partitionable portion.

5. The interface of claim 1 wherein the electronic computer further executes the stored program to report to the industrial controller via the dual-port memory whether the proposed new partitioning value is acceptable to the operation of the network card.

6. The interface of claim 1 wherein the dual-port memory includes a non re-partitionable portion and a re-partitionable portion and wherein reporting back is via a report value stored in the non re-partitionable portion to be read by the industrial controller.

7. The interface of claim 5 wherein the connector half further provides a communication of interrupt signals between the industrial controller and the network card and wherein the reporting to the industrial controller via the dual-port memory concludes with the generation of an interrupt from the network card to the industrial controller.

8. The interface of claim 5 wherein the dual-port memory includes a non re-partitionable portion and a re-partitionable portion and wherein whether the proposed new partitioning value is acceptable is reported to the industrial controller through the non re-partitionable portion.

9. The interface of claim 1 wherein the electronic computer further executes the stored program to:
  write the default value for the partitioning to the dual-port memory prior to receiving via the dual-port memory the at least one proposed new partitioning value;
  and wherein the receiving of an indication of proposed new partitioning values is by reading values of the dual-port memory area changed by the industrial controller.

10. The interface of claim 1 wherein the electronic computer further executes the stored program to rewrite the default values to the dual-port memory when the proposed new partitioning value is not acceptable.

11. The interface of claim 9 wherein the connector half further provides a communication of interrupt signals between the industrial controller and the network card the program reads values of the dual-port memory area changed by the industrial controller in response to an interrupt from the industrial controller.

12. The interface of claim 1 wherein the dual-port memory includes a non re-partitionable portion and a re-partitionable portion, the electronic computer further executes the stored program to
  write a default value for the partitioning to the dual-port memory prior to receiving via the dual-port memory the at least one proposed new partitioning value wherein the default and proposed new partitioning value describe partitioning of the re-partitionable portion of the dual-port memory;
  partition the dual-port memory according to the default values;
  and wherein:
  the step of receiving an indication of the proposed new partitioning value is via an instruction received via the re-partitionable portion of the dual-port memory from the industrial controller including a data field proposing new partitioning values; and
  including the step of writing the proposed new partitioning value to the dual-port memory when they are acceptable to the network interface card.

13. The interface of claim 12 wherein the electronic computer further executes the stored program to report to the industrial controller via the dual-port memory whether the proposed new partitioning value is acceptable to the operation of the network card.

14. The interface of claim 12 wherein the dual-port memory includes a non re-partitionable portion and a re-partitionable portion and wherein reporting back is via a report value stored in the non re-partitionable portion to be read by the industrial controller.

15. The interface of claim 1 wherein the stored program disables operation of the network interface card in providing an interface to a network during program steps (i) and (ii).

* * * * *